US005445470A

United States Patent [19]

Schirtzinger

[11] Patent Number: 5,445,470

[45] Date of Patent: Aug. 29, 1995

[54] TAB LOCKED PIN ATTACHMENT MECHANISM

[75] Inventor: Gary A. Schirtzinger, North Palm Beach, Fla.

[73] Assignee: United Technologies Corporation, Hartford, Conn.

[21] Appl. No.: 172,959

[22] Filed: Dec. 27, 1993

[51] Int. Cl.[6] .................... F16B 19/00

[52] U.S. Cl. .................... 403/79; 403/154; 403/157

[58] Field of Search .................... 403/79, 157, 154, 150, 403/161, 163, 286, 287, 318, 317, 405.1, 406.1, 407.1

[56] References Cited

U.S. PATENT DOCUMENTS

| | | | |
|---|---|---|---|
| 325,221 | 8/1885 | Wright | 403/154 X |
| 933,634 | 9/1909 | Dougherty et al. . | |
| 1,145,193 | 7/1915 | Hammer et al. . | |
| 1,387,989 | 8/1921 | Keagy | 403/154 |
| 1,445,234 | 2/1923 | Palmer . | |
| 1,473,177 | 11/1923 | Coyne . | |
| 1,548,746 | 8/1925 | Ralsten . | |
| 2,596,632 | 5/1952 | Whitehead | 403/79 X |
| 2,743,895 | 5/1956 | Tygh | 248/641 |
| 2,833,574 | 5/1958 | Fife | 403/405.1 X |
| 3,245,705 | 4/1966 | Fangman | 287/20 |
| 3,596,947 | 8/1971 | Ishihara | 403/154 X |
| 4,025,208 | 5/1977 | Donahue | 403/157 |
| 4,034,946 | 7/1977 | Zimmer et al. | 403/157 X |
| 4,207,794 | 6/1980 | Collister | 403/154 X |
| 4,385,418 | 5/1983 | Loftis et al. | 16/381 |
| 4,525,994 | 7/1985 | Alt et al. | 59/85 |
| 4,822,197 | 4/1989 | DeMartino et al. | 403/157 X |

*Primary Examiner*—Randolph A. Reese
*Assistant Examiner*—Harry C. Kim
*Attorney, Agent, or Firm*—Thomas E. Coverstone

[57] ABSTRACT

The present invention is an attachment mechanism with a positive lock to attach two components together in a confined and blind area. The attachment mechanism, attached to a first component, has in one embodiment, a clevis, while the second component has a knuckle to fit into the clevis and is to be pinned through a passageway through the clevis locking the second component. A U-shaped bracket adjacent to the clevis has sidewalls, the sidewalls having a passageway that aligns with a pin passageway, the pin is locked by inserting a tab lock through the pin and the U-shaped bracket.

8 Claims, 3 Drawing Sheets

TAB LOCKED PIN ATTACHMENT MECHANISM

The Government has rights in this invention, pursuant to Contract No. F-33657-83-C-0092 awarded by the Department of the Air Force.

TECHNICAL FIELD

This invention relates to attachment mechanisms.

BACKGROUND OF INVENTION

Attachment mechanisms are used in applications where the attachment of one component to another component is required. Many attachment mechanisms utilize a double locking feature or a positive lock to reduce the possibility that a locking pin will back out of position and thus, prevent the components from becoming disengaged. Current positive locking attachment mechanism technology typically utilizes a method to entrap the locking pin on both ends by sheet metal tabs, commonly known as tab locks, placed in slots located beyond the termination points of the ends of the locking pin, as shown in U.S. Pat. No. 4,525,994. Other methods used to prevent the locking pin from disengagement include the use of threaded pins, jam nuts, cotter pins, or lock wire.

Certain applications for attachment mechanisms with tab locked pins, such as gas turbine engines and exhaust nozzles, require the attachment mechanism to attach to a bracket or knuckle attached to an engine part in a confined and blind area, where the engine assembler cannot see the locking portions of the components during assembly. More recent gas turbine engine practice forbids the use of lock wire on engine component fasteners because lock wire requires more time to maintain the engines and maintenance personnel frequently injure their hands working with lock wire. Using the attachment mechanisms of the prior art does not allow for easy assembly and disassembly in a confined and blind location nor does it allow for the assembly of a plurality of components where each component has dimensional tolerances. When the plurality of components are assembled, the aggregate of the dimensional tolerances create a dimensional tolerance stack up problem for final assembly.

What is needed is an attachment mechanism which can be easily assembled, disassembled, and utilized in a confined and blind area with an assembly dimensional tolerance stack up relief feature.

DISCLOSURE OF INVENTION

It is therefore an object of the present invention to provide a positive tab locked pin attachment mechanism, which is attached pivotally to one engine component, to secure the components together in a confined and blind area by inserting the locking pin in the attachment mechanism and another engine component.

Another object of the present invention is an attachment mechanism that allows for assembly dimensional tolerance stack-up relief for the assembly of a plurality of components and the assembly of the attachment mechanism.

According to the present invention, an attachment mechanism with a positive lock is provided to attach two components together in a confined and blind area, and to secure a locking pin. The attachment mechanism has a clevis and is pivotally attached to a first component. The second component has a member to fit into the clevis and is to be pinned through a passageway through the clevis locking the second component. The attachment mechanism has a pivotally mounted locking means for the pinned assembly.

The forgoing and other features and advantages of the present invention will become more apparent from the following description and accompanying drawings.

BEST MODE FOR CARRYING OUT THE INVENTION

Figure 1:
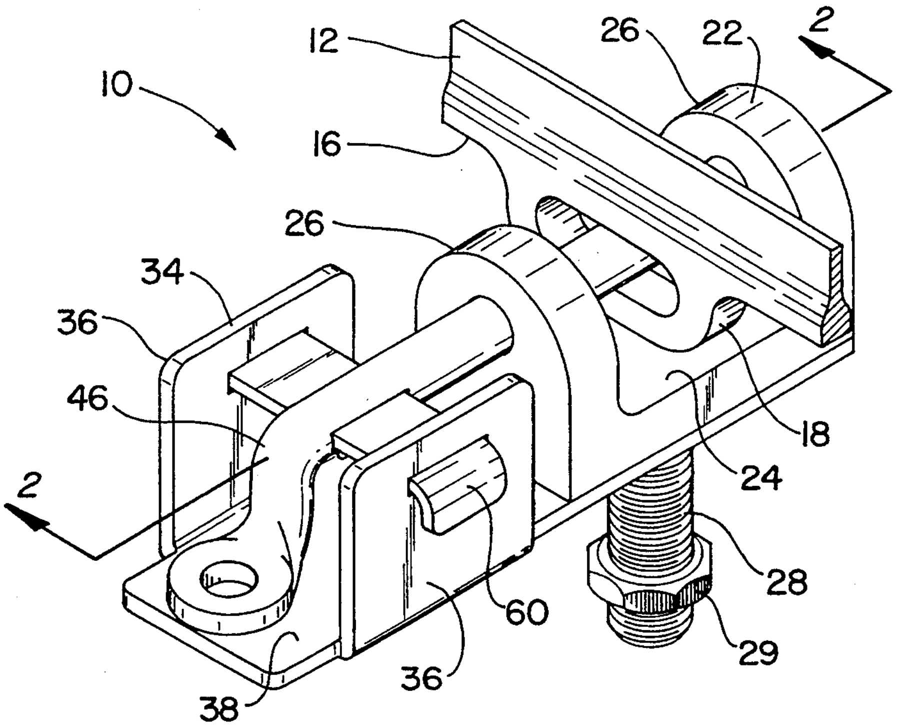
FIG. 1 is a perspective view of an attachment mechanism according the present invention.
Figure 2:
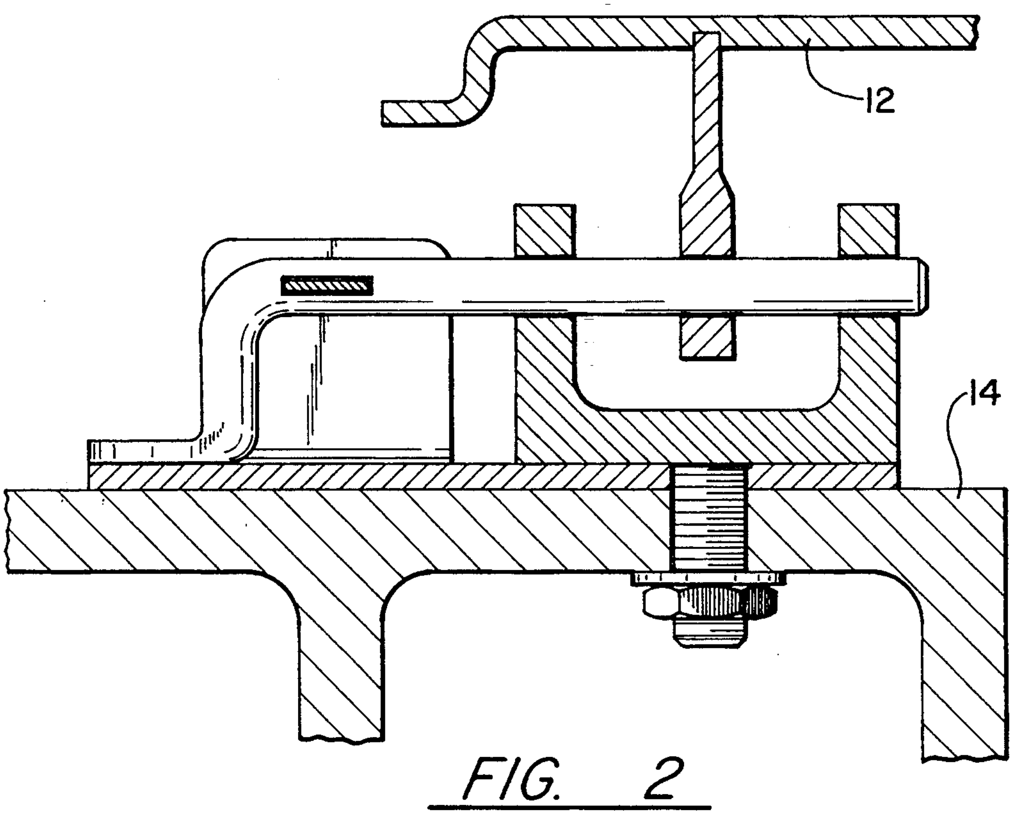
FIG. 2 is a sectional view of the attachment mechanism taken along the line 2—2 of FIG. 1.
Figure 3:
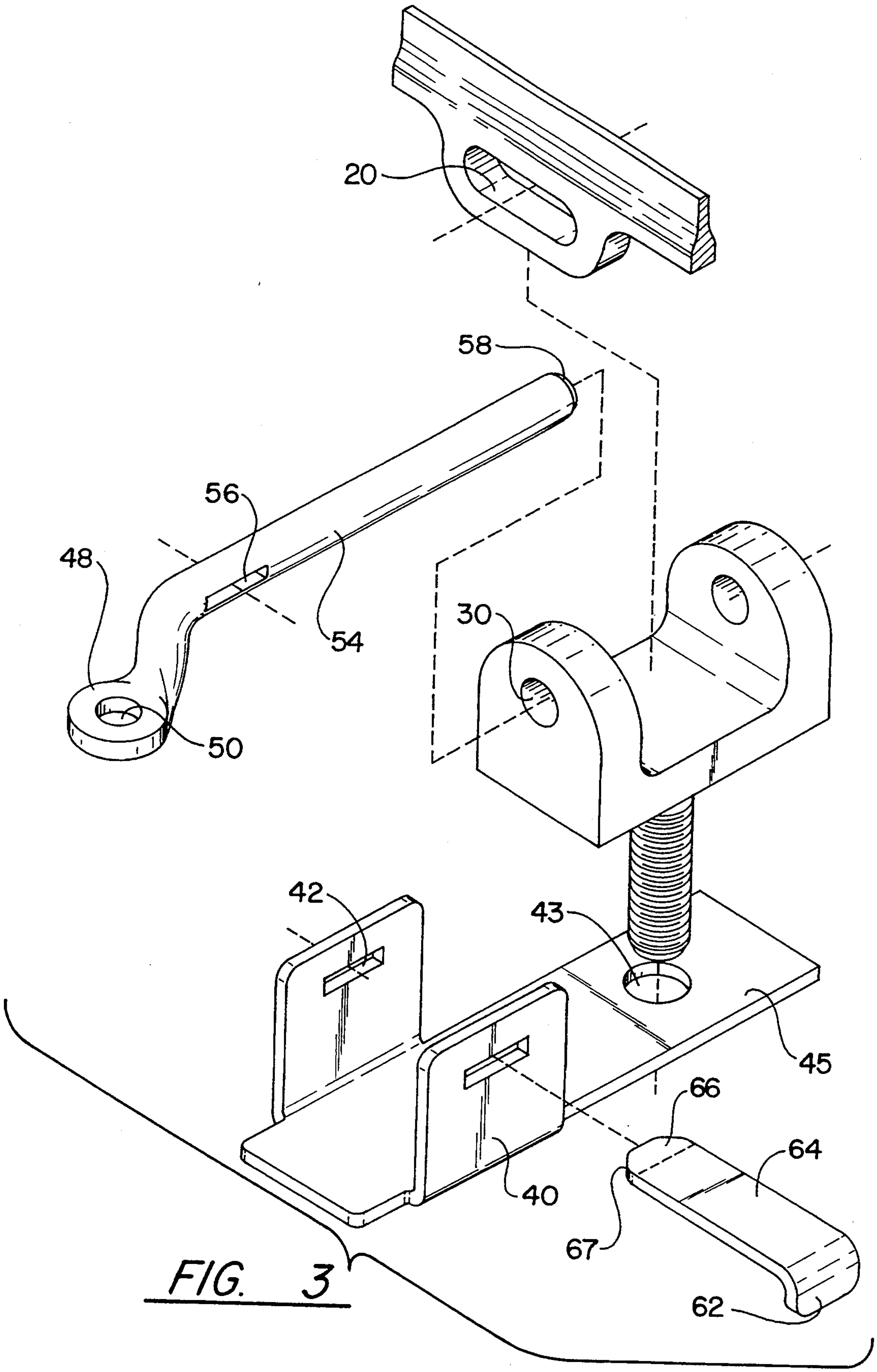
FIG. 3 is a perspective view of the attachment mechanism used in the present invention as it appears before being operably assembled.

As shown in FIG. 1, FIG. 2, and FIG. 3, an attachment mechanism assembly 10 of the present invention includes a clevis 22, a U-shaped bracket 34, an attachment means 28, a pin 46, and a retainer or tab lock 60.

The clevis 22 has a surface 24 with a plurality of knuckles 26 extending outwardly therefrom, the knuckles 26 have a cylindrical passageway 30 therethrough. The clevis 22 has an attachment means, such as a threaded rod 28, the clevis 22 being pivotally attached to a structure or a first component 14. The U-shaped bracket 34 could be incorporated into one of the components being locked together, without limiting the means for locking the pin 46, in this embodiment, the U-shaped bracket 34 has a surface 38 on the same plane or parallel with the clevis surface 24, with sidewalls 36 extending outwardly therefrom in the same direction of the knuckles 26. The U-shaped bracket 34 also has a bracket extension 45 extending outwardly therefrom on the same plane as bracket surface 38, the bracket extension 45 is positioned underneath the clevis, opposite the clevis surface 24. The bracket extension 45 has a bracket opening 43 to accommodate the passage of the clevis threaded rod 28 through the bracket opening 43. The sidewalls 36 have a passageway 42 therethrough. The pin 46 includes a shaft 54, a passageway 56, and a flattened head 48 at one end and a chamfer 58 at the other end, the head 48 having an aperture 50 therethrough. The tab lock 60 could be a pin, lock wire, or any other means for fastening, and without limiting the type of tab lock 60 that may be utilized, in this embodiment, the tab lock is L-shaped prior to being operably incorporated into the attachment mechanism 10. The L-shape is defined by having a first leg 62 and a second leg 64 at a right angle relative to each other, adjacent to leg 64 is a bendable portion 66 having chamfered corners 67.

In the preferred embodiment, the clevis 22 is pivotally attached to a first gas turbine engine component 14 using threaded rod 28 and a nut 29, trapping the U-shaped bracket 34 between the clevis 22 and the first gas turbine engine component 14. A second engine component 12 has a surface 16 with a knuckle 18 extending therefrom, the knuckle 18 having a passageway 20 therethrough. While the attachment mechanism 10 is secured to the first gas turbine component 14 and the second engine component 12 is positioned to be locked to the clevis 22, this creates a confined and blind location relative to the two engine components and the locking pin 46. The second engine component 12 could have a plurality of knuckles 18 interfitting with the clevis 22 having a plurality of knuckles 26. In addition, the second engine component 12 could be pivotally attached and the clevis 22 fixedly, or pivotally attached. During the confined and blind assembly the flattened pin head 48 is held by the assembler and as the pin shaft 54 is guided through the knuckles 26 and the second engine component member 12, the pin 46 is inserted until the pin passageway 56 aligns with the U-shaped bracket passageway 42. The flattened head 48 is aligned in the same or parallel plane as the pin passageway 56 allowing the assembler to coaxially align the pin passageway 56 with the U-shaped bracket passageway 42. If assembly dimensional tolerance stack up has made the insertion of the pin 46 into the cylindrical passageway 30 difficult, the assembler can loosen the nut 29 to allow the clevis 22 to pivot around the threaded rod 28 axis relative to the second component passageway 20, to allow the pin 46 to be inserted more easily than if the clevis 22 did not have this flexibility. In addition, the U-shaped bracket 34 can pivot around the threaded rod 28 axis to allow dimensional tolerance stack up relief in relation to the pin passageway 56 and the U-shaped bracket passageway 42. A bendable portion 66 of the tab lock 60 is guided through the bracket passageway 42 and the pin passageway 56. Prior to being operably incorporated into the attachment mechanism 10, the tab lock 60 is L-shaped as shown in FIG. 3, the bendable portion 66 may have a chamfered or rounded end to ease the insertion of the tab lock 60 into the passageway 42. When the tab lock 60 is placed through the sidewall passageway 42 and the pin passageway 56, one leg 62 of the tab lock 60 is placed adjacent to the outside sidewall surface 40; leg 64 of the tab lock 60 is adjacent to the bendable portion 66, which prior to bending, extends through the pin 46 and both sidewalls 36. The bendable portion 66 is then bent down, thereby preventing any relative movement between the tab lock 60 and the locking pin 46. This effectively prevents axial movement of the pin 46 relative to the clevis 22. Any stress that is transferred through the first component 14 and the second component 12 to the attachment mechanism 10 is transferred through the pin shaft 54, therefore, the tab lock 60 does not experience stress loads transferred through the engine components. If disassembly is required, a pin aperture 50 provides a location for insertion of a standard sized pin or rod (not shown) to apply a force to the pin 46 to disengage the pin 46 from the clevis 22 after removal of the tab lock 60.

Figure 4:
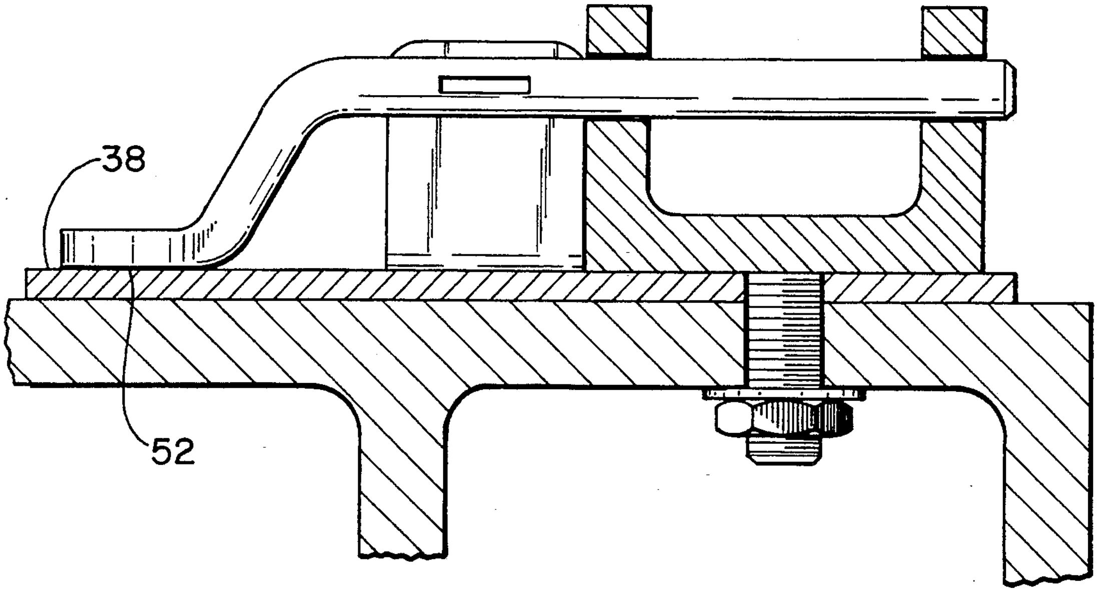
FIG. 4 is a front view of the clevis in a separate embodiment where the pin is offset axially to align the pin shaft with the cylindrical passageway.

A second embodiment of the present invention is shown in FIG. 4 which is identical to the preferred embodiment except that the pin head 48 is offset from the pin shaft 54 axis to the extent that during assembly the pin shaft 54 is located at the proper height to engage the clevis passageway 30 when the flattened pin head surface 52 is slid adjacently to the U-shaped bracket surface 38 while engaging the pin shaft 54 into the clevis passageway 30. During engagement, the pin shaft 54 will be at the proper height for engagement into the clevis passageway 30, in addition, the pin passageway 56 will be aligned axially with the U-shaped passageway 42 for engagement of the tab lock 60 easing assembly of the attachment mechanism 10.

Figure 5:
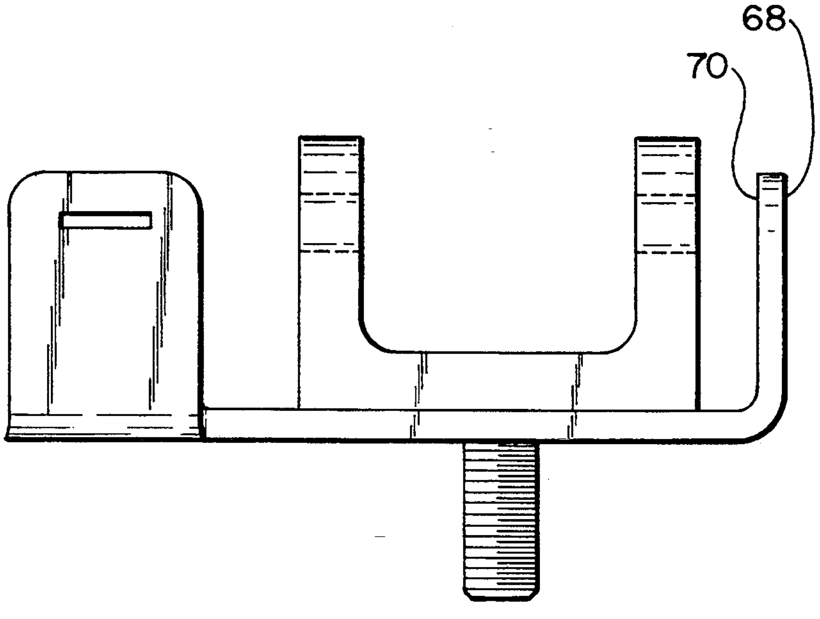
FIG. 5 is a front view of the clevis in a separate embodiment where a pin stop is incorporated.

A third embodiment of the present invention is shown in FIG. 5 which is identical to the preferred embodiment except a pin stop 68 extends from the bracket extension 45 to a height above the clevis passageway 30. During assembly when the pin shaft 54 is fully engaged into the clevis passageway 30 locking second engine component 12, the pin shaft 54 will abut the pin stop inside surface 70. The pin stop 68 is designed to align the pin passageway 56 axially with the U-shaped bracket passageway 42 for ease in assembly of the attachment mechanism 10.

Although this invention has been shown and described with respect to a detailed embodiment thereof, it will be understood by those skilled in the art that various changes in form and detail thereof may be made without departing from the spirit and scope of the claimed invention.

I claim:

1. An attachment mechanism for fastening a first component to a second component in a confined and blind area, the second component having an attachment means, the second component attachment means having a second component passageway therethrough, which comprises:

a clevis pivotally mounted on the first component, the clevis having a clevis surface with at least two knuckles extending therefrom, the clevis accepting the second component, the clevis knuckles interfitting with the second component attachment means, the clevis knuckles having a clevis knuckle passageway therethrough coaxially aligned with the second component passageway;

a pin having a shaft and a head, the shaft extending from the head, the shaft having a pin passageway therethrough, the pin passes through the clevis knuckle passageway and the second component passageway, so that the first component and the second component are fastened together by the pin;

a U-shaped bracket adjacent and pivotally secured to the clevis, the U-shaped bracket having two sidewalls extending therefrom, the sidewalls each having an outside sidewall surface, the bracket sidewalls having a sidewall passageway therethrough, being coaxially aligned with the pin passageway;

a locking member placed through the U-shaped bracket sidewall passageway and the pin passageway so that the locking member prevents axial displacement of the pin relative to the clevis.

2. The attachment mechanism of claim 1 wherein the locking member is a tab lock, the tab lock having a first leg, a second leg and a bendable portion, the bendable portion and the second leg positioned in the U-shaped bracket sidewall passageway and the pin passageway, the first leg being adjacent to the sidewall surface, the bendable portion having a plurality of chamfered edges, the bendable portion being bent not to allow movement of the tab lock relative to the pin.

3. The attachment mechanism of claim 1 wherein the pin head is flattened on the same plane as the pin passageway, the pin shaft having a chamfer, and the pin head having an aperture so that the pin may be removed with a rod placed through the pin aperture after removal of the tab lock.

4. The attachment mechanism of claim 1 wherein the pin head is axially offset from the shaft, the pin head having a surface, where the pin head surface is adjacent to the U-shaped bracket and the pin shaft is located in the clevis knuckle passageway and the second component passageway, so that the offset pin head allows the shaft to be aligned coaxially with the clevis knuckle passageway, the pin passageway being aligned coaxially with the U-shaped bracket sidewall passageway, so that the two existing components may be attached together when the components are located in a confined area and an area that is not visible to the assembler.

5. The attachment mechanism of claim 4 wherein the U-shaped bracket has a pin stop adjacent to the clevis, the pin stop having an inside surface, wherein the pin is located in the clevis knuckle passageway, the pin shaft abutting the pin stop, the pin stop aligning the pin passageway coaxially with the U-shaped bracket sidewall passageway.

6. The attachment mechanism of claim 1 wherein the pin absorbs the shear stress transferred through the first component and the second component.

7. The attachment mechanism of claim 1 wherein the clevis is pivotally mounted on the first component by a threaded rod extending from the clevis through the first component, a nut being adjacent to the first component engaging the threaded rod.

8. The attachment mechanism of claim 7 wherein the U-shaped bracket further comprises a bracket extension positioned between the clevis and the first component, the bracket extension having a bracket opening therethrough, the clevis threaded rod located through the bracket opening so that the U-shaped bracket is pivotally mounted to the clevis.

* * * * *